United States Patent
Nicolai et al.

(10) Patent No.: US 6,604,325 B2
(45) Date of Patent: Aug. 12, 2003

(54) GUIDE TRACK FOR MOVEABLE WINDOWPANE

(75) Inventors: Michael Nicolai, Grobkotzenburg (DE); Andreas Schroeder, Mommenheim (DE); Daniel Drewniok, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 09/927,451

(22) Filed: Aug. 10, 2001

(65) Prior Publication Data

US 2002/0069586 A1 Jun. 13, 2002

(30) Foreign Application Priority Data

Aug. 10, 2000 (DE) .......................................... 100 39 842

(51) Int. Cl.⁷ ................................................ E05F 11/38
(52) U.S. Cl. ...................................................... 49/348
(58) Field of Search .......................... 49/348, 349, 452, 49/404, 502

(56) References Cited

U.S. PATENT DOCUMENTS

| 3,960,403 A | * | 6/1976 | Carella et al. .......... 296/137 B |
| 5,469,656 A | * | 11/1995 | Gier et al. ...................... 49/28 |
| 5,564,230 A | * | 10/1996 | Periou .......................... 49/349 |
| 5,694,717 A | * | 12/1997 | Gier ............................. 49/352 |
| 6,161,337 A | * | 12/2000 | Morando ...................... 49/348 |

FOREIGN PATENT DOCUMENTS

DE   198 59 706   7/2000

* cited by examiner

*Primary Examiner*—Jerry Redman
(74) *Attorney, Agent, or Firm*—Carison, Gaskey & Olds

(57) ABSTRACT

The invention pertains to a guide track for a movable windowpane, especially for a retractable windowpane of a motor vehicle, with at least one guide element for the windowpane displaceable along the guide track. In order to create a guide track with compact installation dimensions and at the same time a sufficient length for guiding the windowpane during its movement, it is proposed that the guide track for movement of the windowpane be retractable at least on one side.

17 Claims, 2 Drawing Sheets

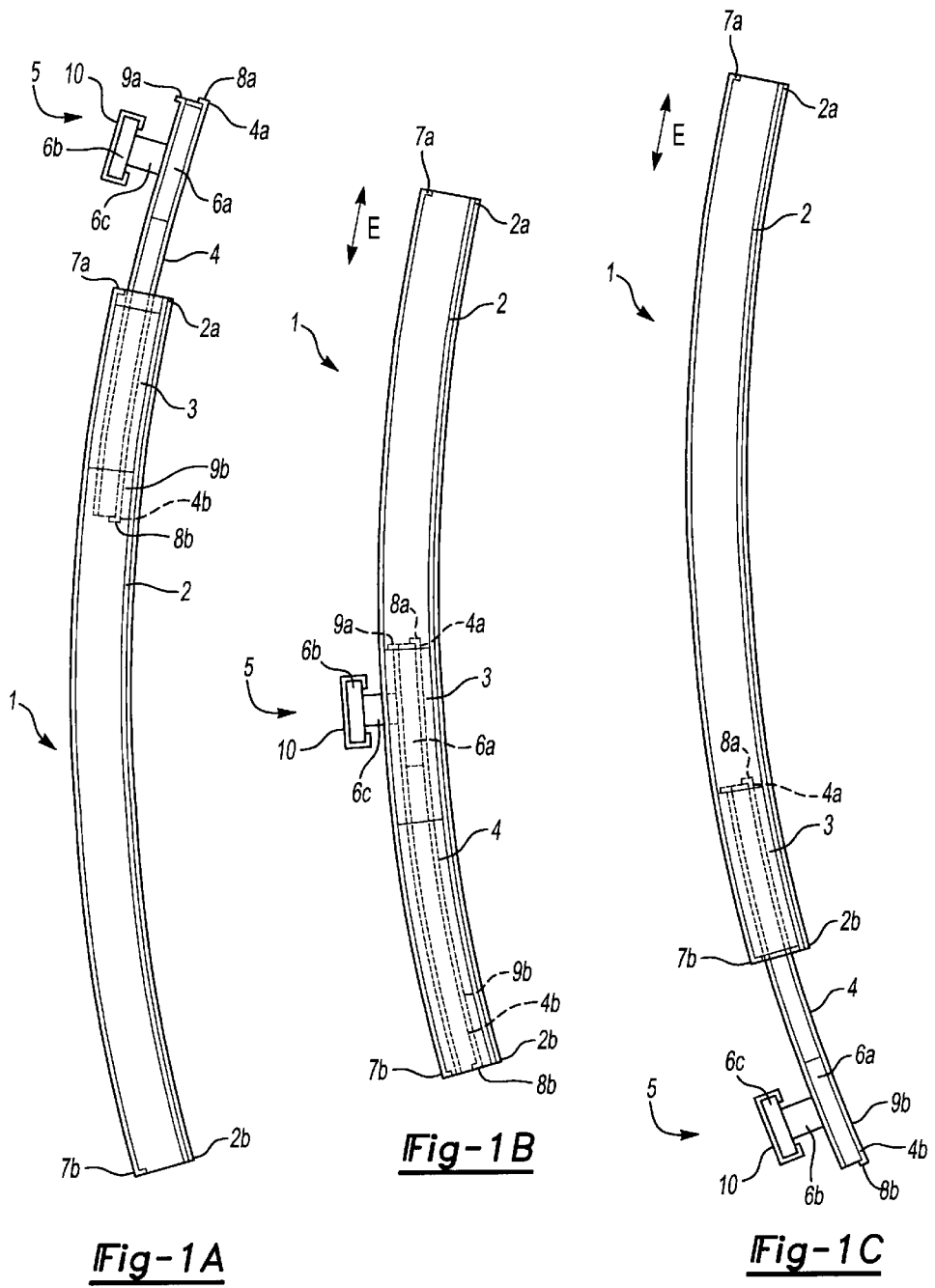

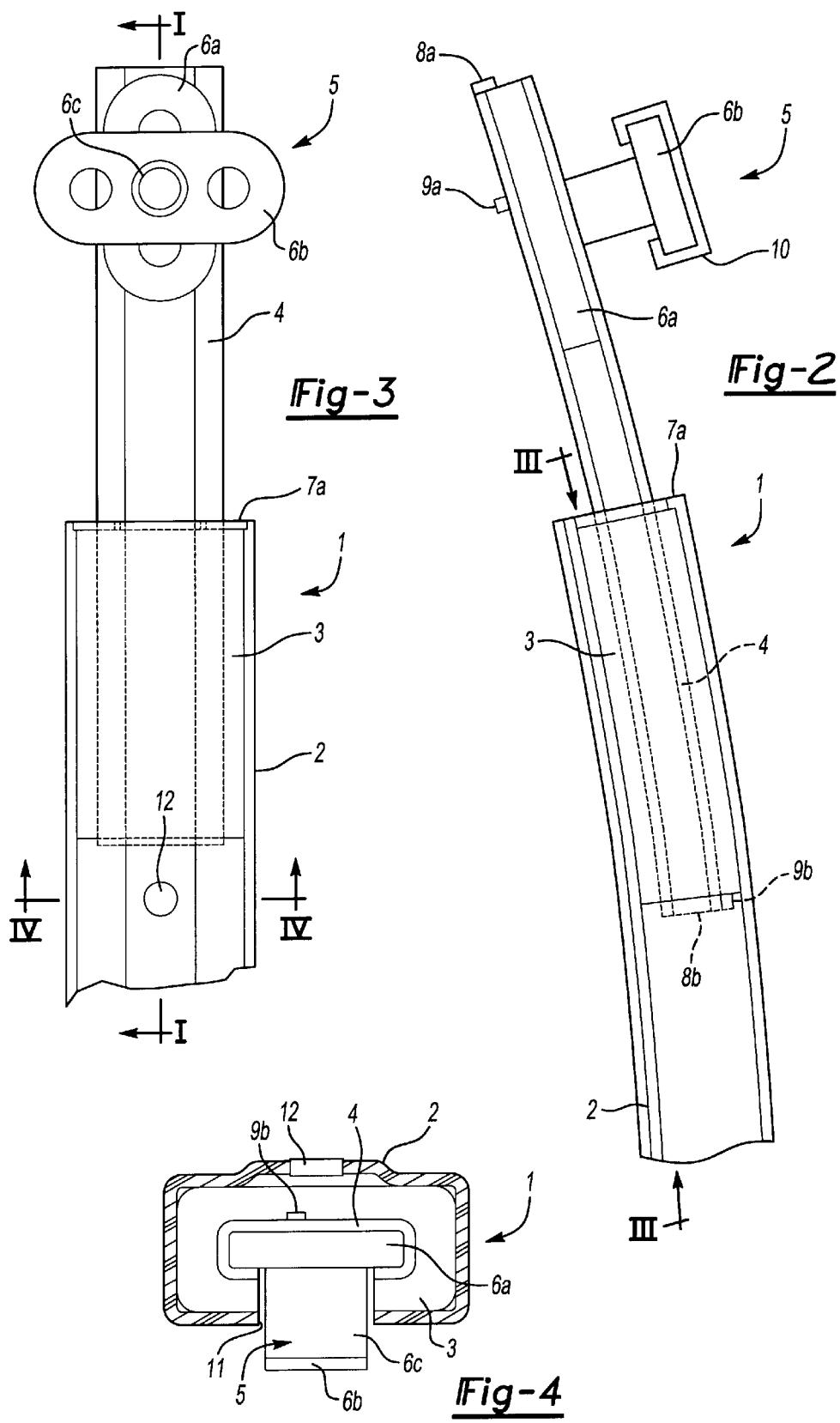

GUIDE TRACK FOR MOVEABLE WINDOWPANE

BACKGROUND OF THE INVENTION

The invention pertains to a guide track for a movable windowpane, especially for a retractable windowpane of a motor vehicle.

A window lifter for raising and lowering a windowpane of a motor vehicle is known from DE 19 859 706 A1. Two guide elements are arranged at the lower edge of the pane by clamping or bolting on. Each of the two guide elements is displaceably mounted in a guide track. To the maximum extent possible, these two guide tracks are arranged mutually parallel yet separated inside the door of the vehicle. The guide elements can be raised and lowered along the guide tracks by means of a cable pull by operation of a crank handle or an electric motor. In addition, the guide elements are rigidly coupled together by a tie-bar. By means of the tie-bar, tilting of the guide elements in the tracks due to external tilting moments acting upon the guide elements during operation should be opposed and therefore smoother running of the guide elements in the guide tracks should be realized.

In the installation of window lifters with two guide tracks in the door of a vehicle or some other part of the body, installation difficulties can be encountered when the access openings are very small or the windowpanes are very tall and the guide tracks are commensurately long.

SUMMARY OF THE INVENTION

Proceeding from the prior art, the fundamental objective of the present invention is to create a guide track for a movable motor vehicle windowpane, especially for a retractable motor vehicle windowpane, that has compact installation dimensions and at the same time sufficient length for guiding the windowpane during its movement.

This objective is realized with a guide track for a movable motor vehicle windowpane.

According to the invention, by the design of the guide track for a movable windowpane it is achieved that the installation of the guide track can be accomplished with the windowpane retracted and guiding of the windowpane is ensured in both the closed or the open state, with the guide track extended. Therefore, the guide track according to the invention can be inserted through smaller access openings in motor vehicle doors or other parts of motor vehicle bodies. These guide tracks, eventually preassembled with other components into a module, can then also be inserted into the door without further installation aids. Due to the smaller dimensions of the guide tracks, the installation can be advantageously accomplished more quickly, and at the same time the risks are minimized of bumping against the body or other parts with the guide track during its installation, which could require costly reworking. With such a retractable guide track, it is also possible to use guide tracks when motor vehicles have especially tall and obliquely configured side windows.

It is advantageous for the guide track to be fashioned with a sort of telescoping configuration, with a base track and at least one extension track. The base track, which also determines the maximum length of the guide track, can then, e.g., together with other components, be pre-mounted on a catch or module plate before the latter is installed in the door of the vehicle. The extension track is inserted into the base track and can be moved out beyond the base track to achieve the required extension of the track. The extension track can be extended only partially beyond the base track, so that the base track can maintain the stability.

The extension track is advantageously designed so as to be movable beyond both ends of the base track, whereby an extraordinary reduction of the overall length of the base track and therefore of the guide track can be achieved which otherwise would need a further extension track and in turn would be more complicate as well as a much weaker construction.

In a special configuration of the invention, the extension track is not carried directly in the base track, but rather is carried by way of a slide element. Here the length of the slide element is less than that of the base track, preferably a fifth of the length of the base track, and is displaceable only to the respective ends of the base track. Appropriate stops are located at the ends of the base track.

In order to arrive at a compact configuration of the guide track, the base track and the slide element are designed with a C-shaped cross section. The slide element then rides in the base track and the extension track rides in turn in the slide element. In a further refinement, the extension track can also be designed with a C-shaped cross section, so as to guide the guide element for mounting the windowpane in its interior. Here the length of the guide element for the windowpane is again less than the extension track, preferably about a fourth of the length of the extension track, and can move along the extension track to its respective ends. Stops are provided at the ends of the extension track to limit the travel of the guide element.

For the design of the guide track with the extension track telescoping out of the base track at both ends, comparable travel of the slide element in the base track is also necessary. This displacement movement is effected especially simply with catches located in the vicinity of the ends of the extension track. These catches also limit the travel of the extension track relative to the slide element.

Advantageously, the guide track and the base track are made of metal and the slide element and the guide element are each made of plastic.

The guide track according to the invention is especially well suited for use in a device for lowering and raising a windowpane of a motor vehicle, especially for raising and lowering a windowpane of a motor vehicle door, which has two essentially parallel guide tracks running separated from each other. In the case of such devices the guide elements of the two guide tracks are advantageously joined together by a tie-bar and connection elements for the windowpane are located on the tie-bar. For connection of the tie-bar to the guide element, the guide element is designed with two slide parts with an essentially rectangular form. The slide parts are arranged parallel to and separated from each other and are connected by a joint as well as rotated by 90° in relation to each other. Then the first slide part can conveniently ride in the C-shaped extension track and, with comparable configuration of the tie-bar with a C-shaped cross section, the second slide part can be inserted into the undercut of the C-shaped tie-bar. Compensation of angular errors is possible by means of the joint.

The aforementioned as well as claimed components described in the embodiment and to be used according to the invention, are not subject to any particular exceptional circumstances with respect to their size, design, material selection and technical conception, such that the selection criteria known in a respective field of application may find unlimited use in the scope of the claims.

BRIEF DESCRIPTION OF THE DRAWINGS

Additional details, features and advantages of the object of the invention may be deducted from the following description of the associate figures representing an example of a preferred embodiment as well as from the subclaims.

The present invention is described below in greater detail, with reference to an embodiment example illustrated in the appended drawings. These depict:

FIG. 1a is a vertical section in a side view of the guide track of the invention in its upward extended position—along section line I—I of FIG. 3;

FIG. 1b is a view as in FIG. 1a, but in a central, non-extended position;

FIG. 1c is a view as in FIG. 1a, but in its downward extended position;

FIG. 2 is an enlargement of FIG. 1a from the area of the upper section of the guide track;

FIG. 3 is a vertical section view of FIG. 2, along section line III—III; and

FIG. 4 is a horizontal section view of FIG. 3, with retracted extension track and guide element only partially depicted—along section line IV—IV of FIG. 3.

DETAILED DESCRIPTION OF THE PREFERRED EMBODIMENT

FIGS. 1a–1c depict a guide track 1 according to the invention, in a configuration extendable toward both ends. The guide track 1 consists essentially of a base track 2, which is installed in an undepicted manner in the interior of a motor vehicle door or a comparable part of the motor vehicle body. The base track 2 has a C-shaped cross section (see FIG. 4). Inside the base track 2 a slide element 3 rides with little play. To this end, the outer contour of the slide element 3 is maximally adapted to the inner contour of the base track 2. Slide element 3, in turn, also has a C-shaped cross section (see FIG. 4). Thus slide element 3 can house an extension track 4 in its interior, with little play. The extension track 4 also has a C-shaped cross section, so that a guide element 5, which serves to secure the undepicted windowpane to be guided, is mounted with little play inside the extension track 4. The guide element 5 consists mainly of a first slide part 6a, the outer contour of which is adapted to the C-shaped extension track 4.

It can also be seen in FIG. 1a that the slide element 3 has a significantly shorter length-viewed in the in-and-out direction E—than that of the base track 2. The length of the slide element 3 in the present embodiment example is about a fifth of the length of the base track 2 in which reduces friction while keeping the accuracy of the guidance quite well. These dimensions are, nevertheless, adaptable to the material used as well as to the demands on the required telescopic capacity of the guide track 1 for the respective applications. The various lengths make it possible for the slide element 3, which serves to guide the extension track 4 in relation to the base track 2, to move along the base track 2 in keeping with the movement of the windowpane and can therefore guide the extension track 4 at both ends 2a and 2b of the base track 2. Similarly, the first slide part 6a of the guide element 5 is shorter than the length -viewed in the in-and-out direction E of the guide track 1—of the extension track 4. Here, the length of the first slide part 6a is about a fourth of the length of the extension track 4. Here, as well, these specifications relate only to the present embodiment example.

FIG. 1a also shows that stops 7a and 7b are provided at the upper end 2a of the base track 2 and the lower end 2b of the base track 2, by means of which the travel of the slide element 3 is limited and the slide element 3 is thus prevented from sliding out of the base track 2. In the same manner, the extension track 4 has on its upper end 4a and its lower end 4b stops 8a and 8b, which limit the travel of the first slide part 6a of the guide element 5 and prevent dislodgement from the extension track 4. In addition, a catch 9a is located on the outside of the extension track 4 at the upper end 4a and another catch 9b is located in the vicinity of the lower end 4b which limit the travel of the extension track 4 and prevent the extension track 4 from sliding out of the slide element 3. The other catch 9b is in the vicinity of the extension track 4, but spaced about an eighth of the length of the extension track 4 away from the lower end 4b of the extension track. The maximum extension of the extension track 4 out of the base track 2 can be adjusted by means of the location of the catch 9b.

FIG. 1b shows a guide track 1 like that in FIG. 1a, but with the individual elements of the guide track 1 in the so-called mounting position, in which the overall length of the guide track 1 is determined by the length of the base track 2. In the shown position of the guide element 5 the undepicted windowpane is correspondingly in an approximately half opened position.

In FIG. 1c the guide track 1 is depicted with the windowpane (guide element 5) fully lowered. It is apparent that the catch 9a abuts now at one end of the slide element 3 and that the slide element 3 has moved down along the base track 2 from the upper position depicted in FIG. 1 a.

A raising operation of a windowpane is now described herebelow, with reference to FIGS. 1a and 1c to explain the operation of the guide track 1: From the open position represented by FIG. 1c, a tie-bar 10 joined to the guide element 5 is raised in the in-and-out direction E by means of an undepicted drive. Depending upon the actual friction between the first slide part 6a in the interior of the extension track 4 and between the slide element 3 and the interior of the base track 2 and the exterior of the extension track 4, the first slide part 6a initially moves in the extension track 4 or the slide element 3 moves in the base track 2 or the extension track 4 moves in the slide element 3. Alternating movement is also possible. In the case of the present description, it is assumed that the first slide part 6a initially moves in the extension track 4 from the lower end 4b in the direction of the upper end 4a, until said first slide part 6a there makes contact with the upper stop 8a. Then the extension track 4 moves in relation to the slide element 3 until the lower catch 9b makes contact at the lower end of the slide element 3, whereupon the slide element 3 moves from the lower end 2b of the base track 2 to the upper end 2a of the base track 2 until it reaches the upper stop 7a there (see FIG. 1a). The guide element 5 is then in the upper extended position and the winder in fully closed positioned.

FIG. 2 shows in mirror image an enlarged section of FIG. 1a in the area of the upper end of the guide track 1. In this drawing, the stops 7a, 8a, and 8b and the catches 9a, 9b described above are more clearly depicted. Also shown is the fact that the tie-bar 10 has a C-shaped cross section and is slipped laterally onto a second slide part 6b of the guide element 5.

Illustrated in greater detail in FIG. 3, in a side view of FIG. 2, is the design of the guide element 5 with its first slide part 6a and its second slide part 6b. It is evident that the slide parts 6a and 6b have an essentially rectangular basic form and are joined together by a shaft 6c. By means of the shaft 6c it is possible to join the two slide parts parallel to and apart from each other (see FIG. 2), as well as rotated by about 90° relative to each other. At the same time, the arrangement of the shaft 6c makes it possible to compensate for tolerances in mounting the tie-bar 10 on the two guide elements 5.

In a top view of FIG. 2—partly in a horizontal section, FIG. 4 shows the extension track 4 displaced into the vicinity of the upper end 2a of the base track 2—see FIG. 3. The compact configuration of the guide track 1 is evident, which is achieved in that the base track 2, the slide element 3 and the extension track 4 all have a C-shaped cross section and fit together telescopically. The shaft 6c of the guide element 5 protrudes laterally outward through the lateral opening 11 in the base track 2, the slide element 3 and the extension track 4, and thus also provide good support of the guide element 5 in guiding the windowpane. It can also be seen in FIG. 4 that the base track 2 has holes 12 in the flange area, so that the latter can be secured inside the door of the motor vehicle or comparable motor vehicle parts.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A device in combination with a windowpane of a motor vehicle comprising: a pair of guide tracks for the windowpane running essentially parallel to and separated from each other, each of the guide tracks including a base track and telescoping extension track carried on the base track by a slide element, and guide element for the windowpane is displaceable along the extension track of the guide track, wherein the guide track is retractable on at least one of a pair of ends of the guide track, and the guide elements are joined together by a tie-bar and at least one connector element for the windowpane is provided on the tie-bar.

2. The device according to claim 1, wherein each of the extension tracks is borne in the respective base track and is partially movable in the respective base track out beyond at least one of a pair of ends of the respective base track.

3. The device according to claim 2, wherein the extension tracks are partially movable out beyond both of the ends of the respective base track.

4. The device according to claim 2, wherein the guide elements for the windowpane have a shorter length than that of the extension tracks and are each displaccable along the respective extension track to a pair of respective ends of the respective extension track.

5. The device according to claim 4, wherein the guide elements are approximately a fourth of the length of the extension tracks.

6. The device according to claim 4, wherein the extension tracks have a substantially C-shaped cross section and each of the guide elements ride in an interior of the respective extension track.

7. The device according to claim 1, wherein the slide elements have a shorter length than that of the base tracks and are each displaceable along the respective base track and to the respective ends of the respective base track.

8. The device according to claim 7, wherein the slide elements are approximately a fifth of the length of the base tracks.

9. The device according to claim 1, wherein the base tracks and the slide elements each have a substantially C-shaped cross section, and each of the slide elements ride in an interior of the respective base track and each of the extension tracks ride in an interior of the respective slide element.

10. The device according to claim 1, wherein an extension stop is located on both of a pair of ends of each of the extension tracks and a base stop is located on both of a pair of ends of each of the base tracks, the stops limiting travel of the respective guide element and the respective slide element, respectively.

11. The device according to claim 1, wherein on an outside of each of the extension tracks and proximate to each of a pair of ends of each the extension tracks, a catch is provided which limits displacement of the extension tracks with respect to the respective slide element and entrain the respective slide element via motion of the extension track.

12. The device according to claim 1, wherein the extension tracks and the base tracks are made of metal and the slide elements and the guide elements are made of plastic.

13. The device according to claim 1, wherein said moveable windowpane is a retractable windowpane of the motor vehicle.

14. The device according to claim 1, wherein the tie-bar has a substantially C-shaped cross section.

15. The device according to claim 1 wherein said device vertically raises and lowers said windowpane.

16. The device according to claim 1, wherein each of the slide elements ride in an interior of the respective base track, each of the extension tracks ride in an interior of the respective slide element, and each of the guide elements ride in said interior of the respective extension track.

17. A device for in-and-out movement of a windowpane of a motor vehicle comprising: a pair of guide tracks for the windowpane running essentially parallel to and separated from each other, each of the guide tracks including at least one guide element for the windowpane displaceable along the guide track, wherein the guide track for in-and-out movement of the windowpane is retractable on at least one of a pair of ends of the guide track, and the guide elements are joined by a tie-bar having a substantially C-shaped cross section and at least one connector element for the windowpane is provided on the tic-bar, and wherein the guide elements include of a first and a second essentially rectangular slide part, which are, via a joint, arranged parallel to and separated from each other and rotated by approximately 90° relative to each other, and the second slide part is positively fitted into an undercut of the substantially C-shaped tie-bar.

* * * * *

UNITED STATES PATENT AND TRADEMARK OFFICE
CERTIFICATE OF CORRECTION

PATENT NO. : 6,604,325 B2  Page 1 of 1
DATED : August 12, 2003
INVENTOR(S) : Michael, Nicolai et al.

It is certified that error appears in the above-identified patent and that said Letters Patent is hereby corrected as shown below:

Column 5,
Line 37, should read -- a telescoping extension track carried on the base track a --
Line 38, should read -- slide element, and a guide element for the windowpane is --
Line 53, "displaccable" should be -- displaceable --

Column 6,
Line 24, should read -- of a pair of ends of each of the extension tracks, a catch is --
Line 53, "tic-bar" should be -- tie-bar --

Signed and Sealed this

Sixteenth Day of December, 2003

JAMES E. ROGAN
*Director of the United States Patent and Trademark Office*